United States Patent [19]

DiLemmo

[11] Patent Number: 4,908,800
[45] Date of Patent: Mar. 13, 1990

[54] MULTI-CHANNEL ACOUSTIC SIMULATOR

[75] Inventor: Marc C. DiLemmo, Warminster, Pa.

[73] Assignee: The United States of America as represented by the Secretary of the Navy, Washington, D.C.

[21] Appl. No.: 367,814

[22] Filed: Jun. 19, 1989

[51] Int. Cl.[4] ............................................. H04B 17/00
[52] U.S. Cl. ........................................... 367/13; 434/9
[58] Field of Search .................... 367/13; 434/6, 7, 8, 434/9, 10; 73/1 DV

[56] References Cited

U.S. PATENT DOCUMENTS

| | | | |
|---|---|---|---|
| 3,196,199 | 7/1965 | Wolf et al. | 434/9 |
| 3,363,045 | 1/1968 | Pommerening | 367/13 |
| 3,676,565 | 7/1972 | Rowe | 434/6 |
| 4,386,913 | 6/1983 | Assard | 434/9 |
| 4,626,217 | 12/1986 | Tardif et al. | 434/9 |

Primary Examiner—Thomas H. Tarcza
Assistant Examiner—Daniel T. Pihulic
Attorney, Agent, or Firm—Susan E. Verona; James B. Bechtel; James V. Tura

[57] ABSTRACT

A plurality of hydrophone output signals representative of an ocean bottom are simulated to test a receiver of the sonar sounding system. The phase shift of the output of each hydrophone at each snapshot is determined along with the amplitude. This information is stored for use during simulation. During the simulation, a carrier signal, along with the recorded phase shift amplitude information, are applied to a phase shifter to phase shift the carrier signal in accordance with the recorded phase shift data for each channel and attenuate the phase shifted signal. The phase shifted and attenuated output is applied to a channel of a receiver of the sonar sounding system. Two phase shift words representative of the phase shift of the hydrophone can modulate a master and a delayed master respectively to provide better results. The phase shift data may be selectively applied to the receiver of the sonar sounding system to test the receiver at a plurality of different resolutions.

20 Claims, 6 Drawing Sheets

MULTI-CHANNEL ACOUSTIC SIMULATOR

STATEMENT OF GOVERNMENT INTEREST

The invention described herein may be manufactured and used by or for the Government of the United States of America for Governmental purposes without the payment of any royalties thereon or therefore.

BACKGROUND OF THE INVENTION (a) Field of the Invention

This invention relates to acoustic simulators for simulating signals provided by hydrophones in multi-transducer sonar sounding systems for laboratory or dockside testing of multi-transducer sonar sounding systems. In particular, the invention relates to a system which electrically replaces the hydrophone of a multi-transducer sonar array sounding system.

(b) Discussion of the Prior Art

At present it is very difficult to provide the acoustic signals generated by a large array of hydrophones which accurately represent the ocean bottom and, in real time, apply the signals to an array sounding system for testing the array sounding system. For example, the Sonar Array Sounding System (SASS) currently in operation on board T-AGS 22, 34, 38, and 39 Oceanogragraphic Survey Vessels includes one hundred forty four hydrophones in its receiving array. Thus in order to simulate hydrophone output and test the SASS, one hundred forty four signals must be applied to the SASS during each simulator update. These updates occur on the order of every 2.5 msec and take place for a duration of three to five seconds. Providing this much data to the SASS is a complex operation requiring a very large bandwidth.

The Dummy Hydrophone Array (DHA) was a test set which simulated hydrophone output for testing of SASS. Hydrophone output was simulated in the DHA by providing an echo signal having a constant amplitude and varying phase. This technique was used to select a single one of the ninety one possible beams which a SASS produces from the hydrophone outputs. The selected beam was in either an on state or an off state. Since the DHA could thus only simulate one beam at a time it could troubleshoot the beam forming function but could not produce a composite acoustic output which accurately represented a complete slice of the ocean bottom.

Another test system available to troubleshoot a SASS was the Sonar Test Signal Generator (STSG). The STSG was used to simulate minimum and maximum pulse-widths of bottom return signals. The STSG produced only one output signal which was injected across all one hundred forty four hydrophones in parallel. However, in order to accurately reproduce the ocean bottom, one hundred forty four distinct, phase related, acoustic signals must be applied to the SASS rather than a single signal injected in parallel across all of on hundred forty four hydrophones. Therefore the STSG could not be used to provide a true acoustic simulation.

U.S. Pat. No. 3,363,045, issued to Pommerening on Jan. 9, 1968, teaches a sonar target simulator in which forty eight channels of data were simulated from the output of a sound reproduction system. In the simulator of Pommerening a single signal was applied to a plurality of delay lines and pulse shapers for simulating the signals of the forty eight channels. Since these forty eight channels all contained data from the same data point, the result could not represent real bottom data.

U.S. Pat. No. 3,676,565, issued to Rowe on July 11, 1972, teaches a method for synthesizing a time domain waveform. Time domain waveforms were provided with improved resolution in this method by processing them with Fourier transforms to obtain time domain data which was added and passed through a digital to analog converter to provide analog time domain waveforms. However performing these transforms on all signals from each hydrophone for each update of the simulation for a large number of hydrophones is too time consuming. Additionally, the resolution with which a SASS could be tested from these waveforms was still dependent on the resolution of the digital data.

In view of the difficulty in testing a SASS with signals representative of a real ocean bottom, cumbersome methods of testing SASS improvements at sea were used. Incremental changes, on a not to interfere basis, were made to a SASS and tested during sea trials. If the changes did not perform as expected, they were removed so that the ship could perform its responsibilities with fully operational equipment. If a major hardware update was required, both the new hardware and the existing hardware were installed in parallel and both systems were prepared for full operation. Thus the ship could use the existing hardware if the new hardware did not perform as expected. These constraints produced long delays and additional costs.

SUMMARY OF THE INVENTION

A plurality of hydrophone output signals representative of an ocean bottom are simulated to test a receiver of a sonar sounding system. The phase shift of the output of each hydrophone at each instant in time is determined along with the amplitude. This information is stored for use during simulation. During the simulation a carrier signal, along with the recorded phase shift and amplitude information, are applied to a phase shifter to phase shift the carrier signal in accordance with the recorded phase shift data for each channel and to attenuate the phase shifted signal. The phase shifted output is applied to a channel of a receiver of the sonar sounding system.

DETAILED DESCRIPTION OF THE PREFERRED EMBODIMENTS

Figure 1A:
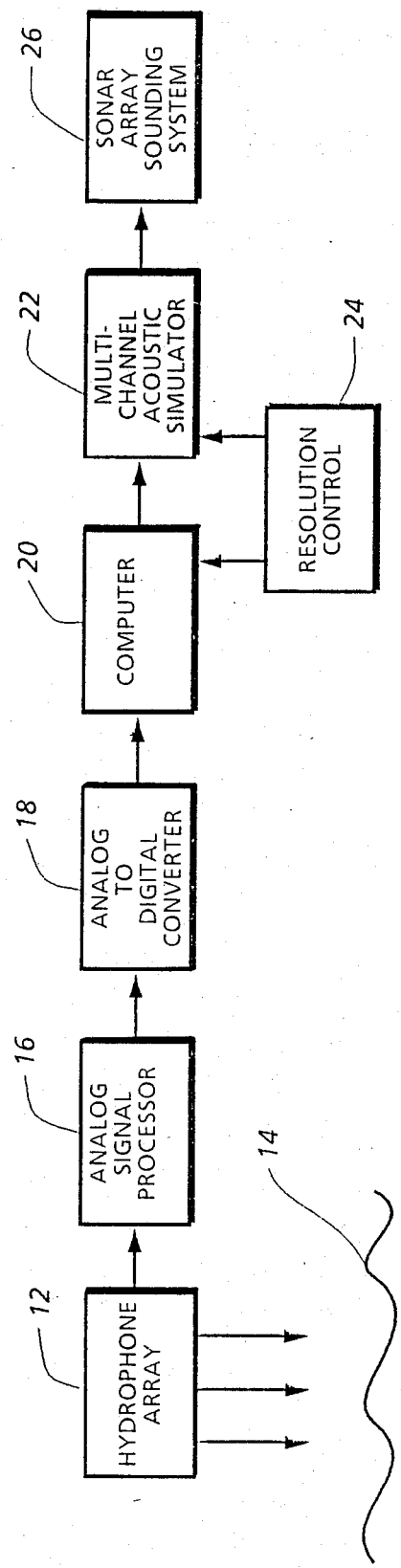
FIG. 1A shows the interrelationship between the multi-channel acoustic simulator system of the present invention and the testing environment of a sonar array sounding system.

Referring now to FIG. 1A, there is shown a block diagram representation of test system 10 of the present invention. Test system 10, including multi-channel acoustic simulator (MCAS) 22 provides a test environment for testing sonar array sounding system (SASS) 26 at a plurality of differing SASS 26 resolutions from a single data set obtained by reading ocean bottom 14 by hydrophone array 12.

Hydrophone array 12 of test system 10 applies signals representative of echoes from ocean bottom 14 to analog signal processor 16 The signals from array 12 are received by analog signal processor 16 and applied to analog to digital converter 18. The rate at which the output of array 12 is sampled by processor 16 and analog to digital converter 18 determines the angular resolution of the data collected. Faster sampling rates permit greater resolution. Thus each different resolution of SASS 26 requires a corresponding minimum sampling rate and analog to digital converter 18 samples the data provided by analog signal processor 16 at a sampling rate corresponding to the highest resolution of SASS 26 to be tested.

A single data set containing the high resolution digital sample data from analog to digital converter 18 is stored in computer 20. This sample data set contains one word of inphase amplitude information and one word of quadrature amplitude information for each of the individual hydrophones within array 12 for each update or snapshot of ocean bottom 14.

Under the control of resolution control 24, data received by computer 20 from analog to digital converter 18 is selectively transmitted to MCAS 22. The data transmitted from computer 20 to MCAS 22 is extracted from the data stored in computer 20 in accordance with the desired SASS 26 testing resolution. If SASS 26 is tested at the maximum resolution, corresponding to the sampling frequency of the data provided by analog to digital converter 18, all the data stored in computer 20 is used under the control of resolution control 24. If SASS 26 is tested at less than this maximum resolution then a subset of the data in computer 20 is extracted and used by MCAS 22 under the control of resolution control 24. Thus system 10 can test SASS 26 at a plurality of different resolutions from the single analog data set applied by hydrophone array 12 to signal processor 16, digitized by analog to digital converter 18 and stored in computer 20.

MCAS 22, in accordance with data received from computer 20, provides to SASS 26 signals representative of the signals applied to analog signal processor 16 by hydrophone array 12. Reconstruction of these signals from the data transmitted to MCAS 22 by computer 20 is performed by MCAS 22 in accordance with information on the desired resolution applied to MCAS 22 by resolution control 24. Analog signal processor 16 may be an additional SASS (not shown) on board a ship to which hydrophone array 12 is attached. The functions performed by signal processor 16 include converting twelve kilohertz analog signals received from hydrophone array 12 into the inphase and quadrature analog signals for each hydrophone in array 12.

Figure 1B:
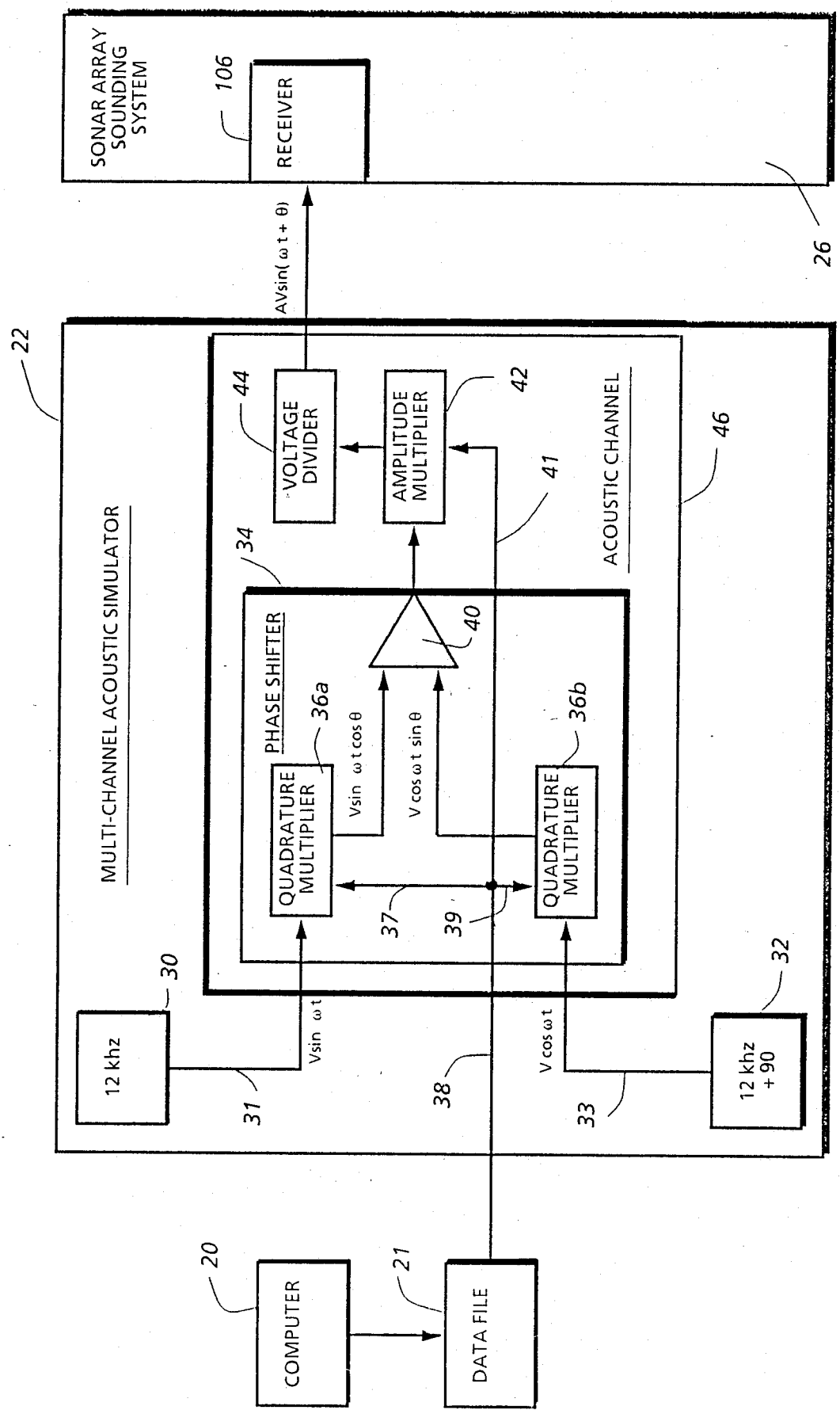
FIG. 1B shows a more detailed representation of a portion of the system of FIG. 1A.

Referring now to FIG. 1B, there is shown a more detailed representation of a portion of system 10 used by system 10 during simulation. Computer 20 of system 10 provides digital acoustic data file 21 containing data corresponding to each update, or snapshot, applied to SASS 26 during a simulation by MCAS 22. The data applied to SASS 26 includes phase and magnitude values, produced from the inphase and quadrature data, which represents a known ocean bottom 14 profile. The data within digital data file 21 is transferred to MCAS 22 for conversion into complex analog signals which are applied to SASS 26. The data within data file 21 can include three eight bit words for each snapshot for each acoustic channel 46 of MCAS 22, applied by way of line 38, wherein each channel 46 corresponds to a hydrophone within hydrophone array 12.

One of the three words applied to channel 46 is the cosine of the phase angle of the hydrophone signal sampled by analog to digital converter 18. This word is applied to quadrature multiplier 36a by way of line 37. Another word received by way of line 38 is the sine of the hydrophone signal. This sine is applied to a quadrature multiplier 36b by way of line 39. The third word represents the amount of attenuation (A). This word is applied to amplitude multiplier 42 by way of line 41. Each acoustic channel 46 also receives two reference signal inputs by way of lines 31, 33 respectively from a master frequency reference 30 and reference 32 corresponding to the master frequency shifted by ninety degrees. Master frequency reference 30 provides a signal of the same frequency as the signals used for the sounding of ocean bottom 14, for example twelve kilohertz.

Within MCAS 22 there is provided an individual phase shifter 34 for each channel 46 of MCAS 22. Each digital phase shifter 34 accepts the signals of references 30, 32 and data file 21 to produce a signal delayed from master reference 30 by the correct phase angle at the output of summing amplifier 40. The output signal of amplifier 40 is then attenuated by amplitude multiplier 42 using magnitude data from data file 21 applied by line 41.

In response to receiving such channel output data for all channels simultaneously from respective acoustic channels 46 sonar receiver 106 within SASS 26 processes the phase differences and the magnitude information between adjacent acoustic channels and resolves target information. By updating the three words for each acoustic channel 46 at a high data rate, nearly continuous coherent acoustic data can be produced for any number of hydrophone channels 46. This simulation data can therefore be an exact representation of the data SASS 26 would receive if SASS 26 were coupled to hydrophone array 12 while hydrophone array 12 is sounding ocean bottom 14 thereby allowing a true test of SASS 26.

Figure 2:
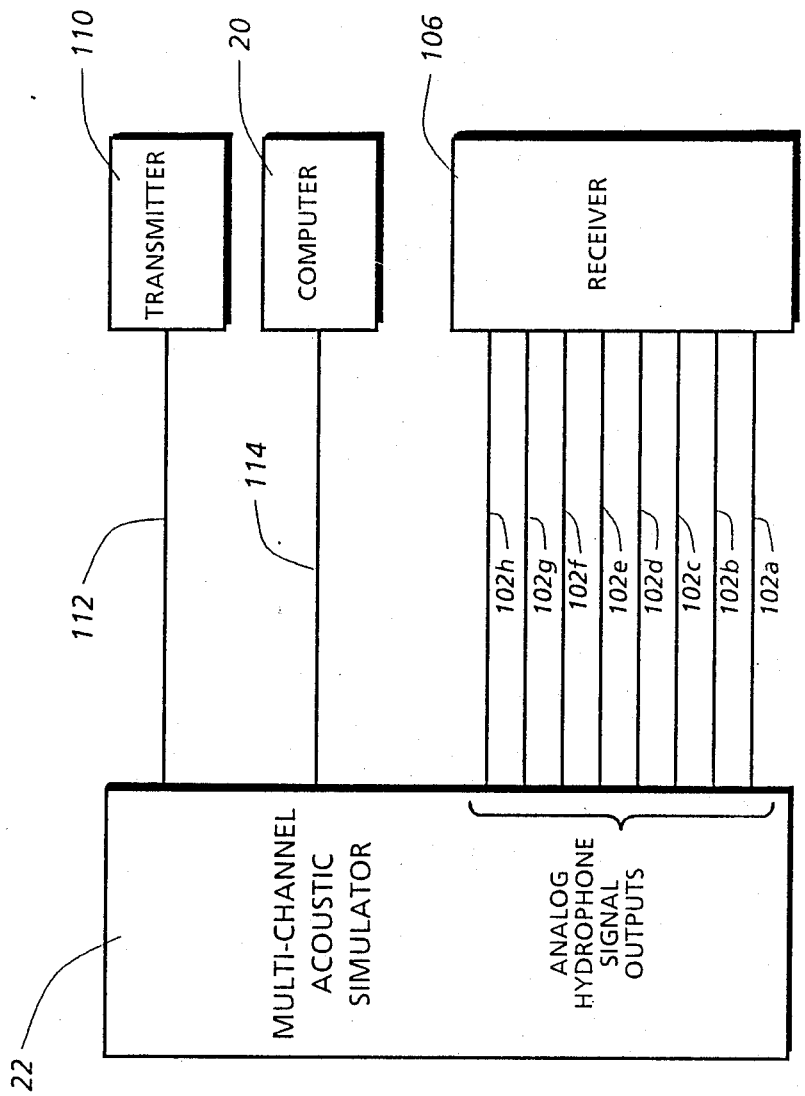
FIG. 2 shows the interface between the multi-channel acoustic simulator system of FIG. 1 and a receiver of a sonar ray sounding system.

Referring now to FIG. 2, there is shown the interface between MCAS 22 and receiver 106 which is provided within a one hundred forty four channel SASS 26. MCAS 22 applies one hundred forty four hydrophone signals to receiver 106 by way of lines 102a–h for each snapshot in order to test receiver 106. Each of the eight lines 102a–h carries signals for eighteen hydrophone channels within receiver 106. To begin simulation by MCAS 22, transmitter 110 provides a key pulse to MCAS 22 by way of line 112. The key pulse applied to MCAS 22 by way of line 112 initiates a transmit cycle wherein information simulating the one hundred forty four analog hydrophones of array 12 is applied to receiver 106.

Figure 3:
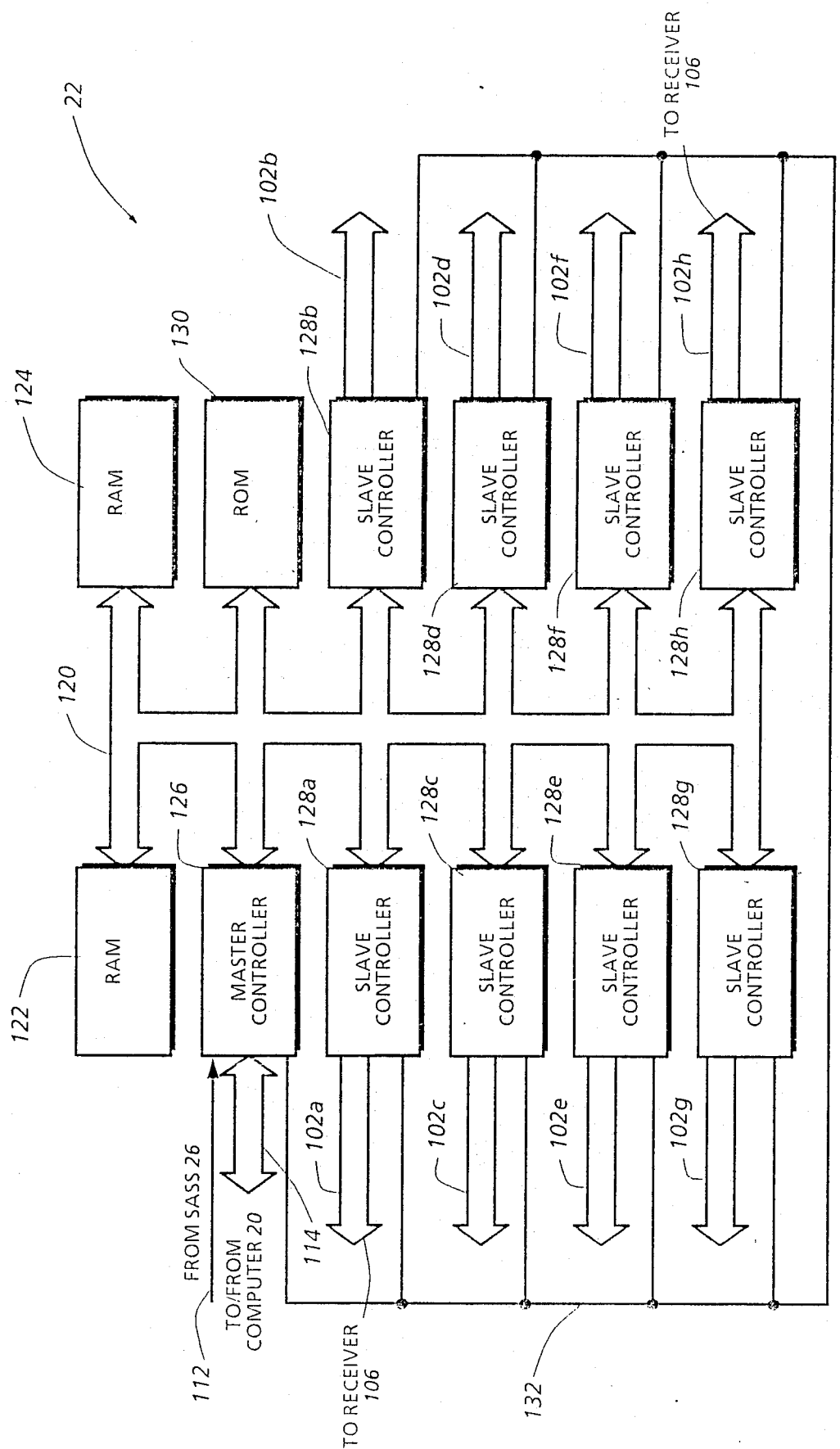
FIG. 3 shows a more detailed representation of the multi-channel acoustic simulator system of the present invention.

Referring now to FIG. 3, there is shown a more detailed representation of MCAS 22. MCAS 22 has two operating modes: (1) a stand alone mode and (2) a mode using data from optional external computer 20. In either mode MCAS 22 is designed to be interfaced with receiver 106 of a multi-transducer sonar system such as SASS 26 and to test SASS 26 by applying simulated hydrophone output signals to receiver 106 of SASS 26 by way of lines 102a-h.

In the stand alone mode information to generate the simulation signals is contained in ROM 130 of MCAS 22. In order to perform this simulation MCAS 22 translates the digital acoustic data in ROM 130 which is representative of ocean bottom data into analog signals. The digital acoustic data in ROM 130, used for the stand alone mode of MCAS 22, can be extracted from real acoustic analog data signals by digitizing the actual outputs of hydrophone array 12 operating on board a ship and storing the digitized values by system 10. Additionally, the digital data for the stand alone mode of MCAS 22 can be generated by a software bottom model adapted to generate data representative of real ocean bottoms. MCAS 22 applies signals to receiver 106 of SASS 26 for simulation and testing of SASS 26 equally well for either of these two sources of digital acoustic data. In this stand alone mode only one word of information per snapshot is required since only flat bottom simulation data is stored in ROM 130. This one word represents one of the angles of intersection between the spherical sonar wave front and the ocean bottom 14. The other intersection is located symmetrically with respect to the angle represented by this one word. Thus from this one word each slave 128a-h can provide data to its respective eighteen channels.

In the second operating mode of MCAS 22 simulation signals are generated from data representative of signals generated by hydrophone array 12 and stored in computer 20 rather than in ROM 130. Using computer 20 more data can be stored and transmitted to MCAS 22, permitting higher resolution testing of receiver 106 of SASS 26. In this mode all three words for every snapshot for every hydrophone in hydrophone array 12 are stored in slave controllers 128a-h for application to receiver 106. It will be understood by those skilled in the art that this second mode can be practiced without external computer 20 if a large enough ROM 130 is provided.

Data from a single hydrophone in array 12 is meaningless alone. Useful information is contained in the relationship between the data from adjacent hydrophones. The relative phase and amplitude differences between adjacent hydrophones, at each instant, contain the required ocean bottom 14 information. These phase and amplitude values are reconstructed by hardware within MCAS 22 having both phase and amplitude control.

SASS 26 is based on a twelve kilohertz transmit frequency. Generating the required echo signal from this using digital to analog converter technology would be practical only for a small number of channels 46. MCAS 22 thus uses phase modulation techniques which require a much smaller bandwidth than digital to analog converter technology requires. The master twelve kilohertz carrier frequency is modified with phase delay and amplitude information for each acoustic channel.

By communication between master controller 126 and slave controllers 128a-h of MCAS 22, MCAS 22 translates information relating to one hundred forty four sets of sine, cosine and amplitude values into ..one hundred forty four complex analog signals which contain all of the phasing and amplitude information that the actual hydrophone array 12 produced when receiving echoes from ocean bottom 14. The one hundred forty four sets of data are updated periodically by MCAS 22 using data stored in slave controllers 128a-h to provide one complete acoustic signal. The update period may vary between five hundred microseconds and five milliseconds depending on the resolution required. The data for each snapshot or update for every one of the one hundred forty four channels of SASS 26 is therefore stored in memory within slave controllers 128a-h and applied to receiver 106 at each snapshot. Master controller 126 of MCAS 22 coordinates the determination of the acoustic signals by slave controllers 128a-h. All timing signals for this process are produced on master controller 126.

Figure 4:
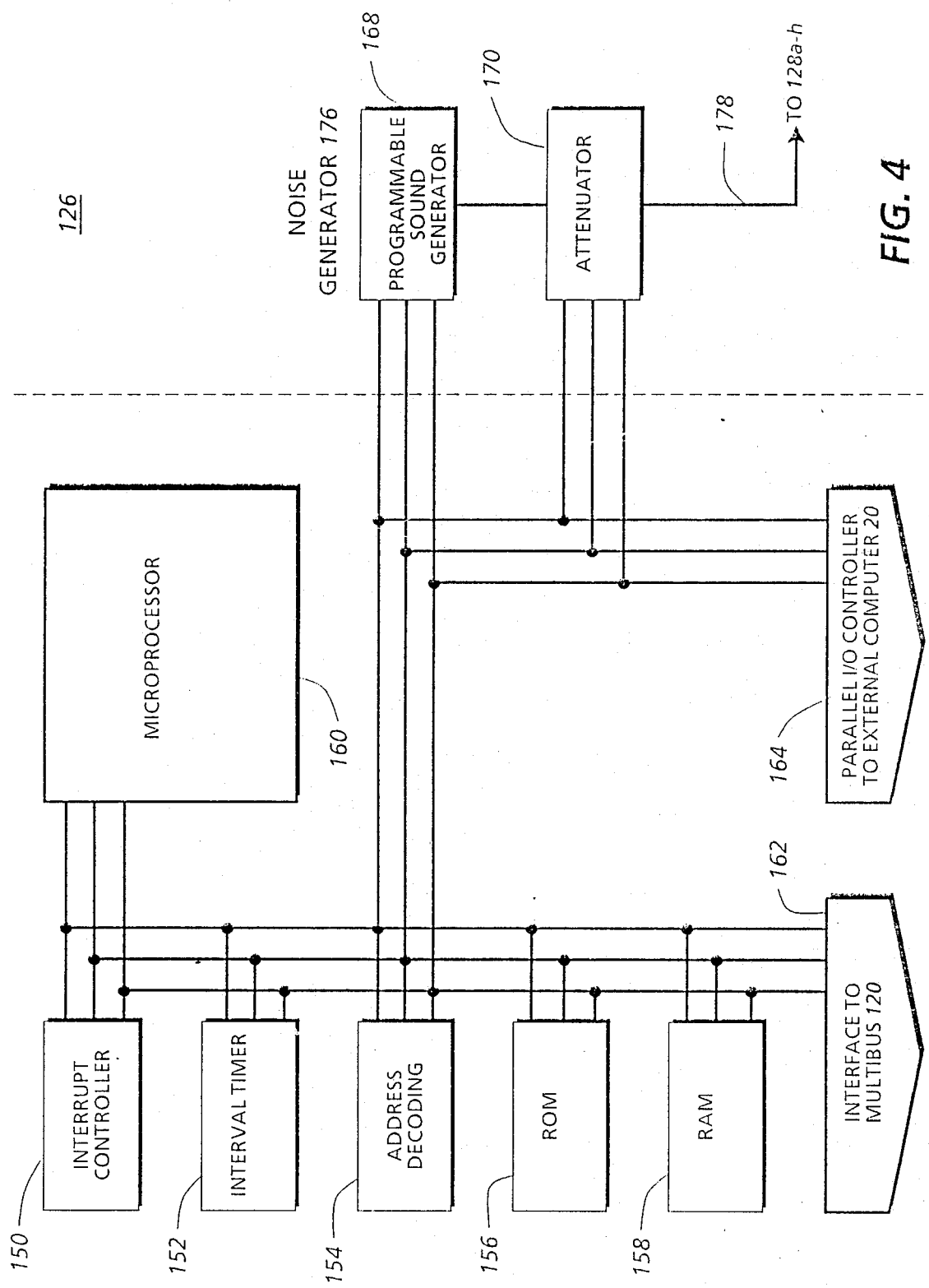
FIG. 4 shows a block diagram representation of the master controller of the multi-channel acoustic simulator of the present invention.
Figure 5:
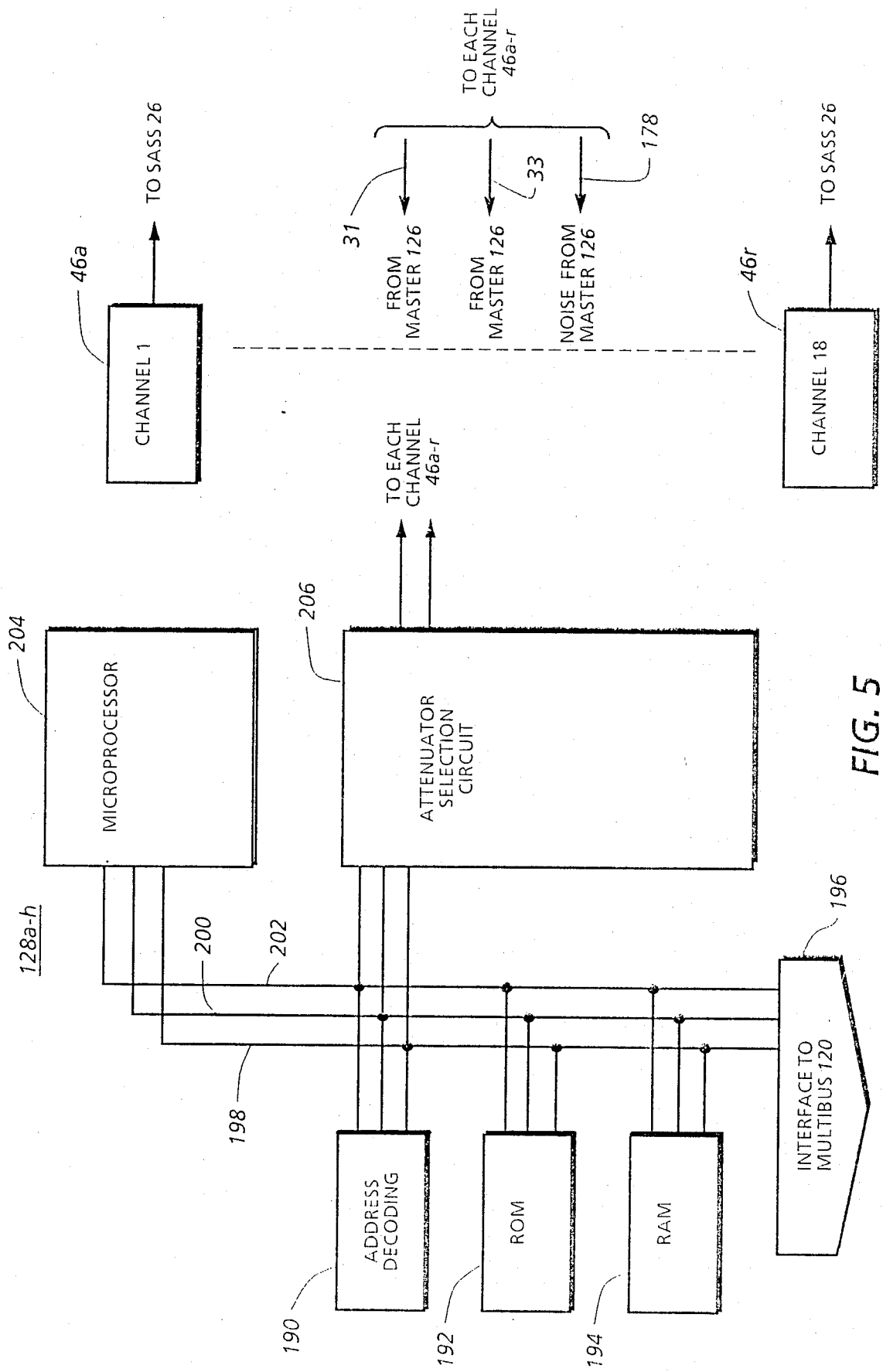
FIG. 5 shows a block diagram representation of slave controller of multi-channel acoustic simulator system of the present invention.

Referring now to FIGS. 4, 5 there are shown block diagram representations of, respectively, master controller 126 and slave controllers 128a-h. These block diagram representations are provided to permit a more detailed description of the internal functions of master controller 126 and slave controllers 128a-h. In the external computer mode of MCAS 22, for each different snapshot and for each hydrophone in array 12, three data words signals are provided by computer 20 and transmitted to master controller 126. This data is distributed to each of the eight slave controllers 128a-h over multibus 120 of MCAS 22 when MCAS 22 operates with computer 20 and receives simulation data from computer 20. These three data words contain the same information as the two words provided by analog to digital converter 18, but in a form compatible with existing MCAS 22. Use of these three words for each snapshot permits high resolution simulation. When MCAS 22 operates in the stand alone mode without computer 20, and simulation information is stored in ROM 130, only one word of information is stored for each snapshot. This one word of information is the target angle. Slave controller 128a-h then calculates the three data words for each of its eighteen channels 46.

In response to the data from master controller 126 each slave controller 128a-h provides eighteen of the one hundred forty four acoustic signals applied to SASS 26 by MCAS 22. Each slave controller 128a-h is loaded with this data under the control of master controller 126. Master controller 126 then coordinates slave controllers 128a-h using reset and step commands. The reset command places each slave controller 128a-h into a known waiting condition prior to simulation. When simulation begins the step command is issued periodically. The period of the step command varies from five hundred microseconds to five milliseconds depending on SASS 26 resolution. The step commands cause each slave 128a-h to update the data of each of its acoustic channels. The updated values are stored in local RAM 194 of each slave controller 128a-h.

To separate the digital and low level analog signals and avoid cross talk, all digital and analog signals travel physically separate pathways. The digital signals travel over, for example, multibus 120 and interface 196 while the analog signals travel, for example, over analog bus 132. Multibus 120 and all digital data transfers are controlled by master controller 126. Each slave controller 128a-h is designed to allow master controller 126 to take control of local buses within slave controllers 128a-h so that master controller 126 can load phase and amplitude data into local RAM 194 of slave controllers 128a-h for controlling the phase and amplitude of signals applied to receiver 106 by MCAS 22. This provides rapid data updates using direct memory access under control of master controller 126. Both master controller 126 and slave controllers 128a–h use interrupts for time critical events. For example, interrupt controller 150 of master controller 126 controls initiation of updates during simulation.

After power up or reset of MCAS 22 each controller 126, 128a–h in MCAS 22 executes an internal diagnostic. Upon successful completion of the diagnostic, master controller 126 executes setup functions before enabling a transmit key detection circuit (not shown) which permits master controller 126 to recognize the signal initiating a simulation.

Slave controllers 128a–h complete their diagnostics in parallel with master controller 126. The slave diagnostic first sets one bit in its I/O register to tell master controller 126 that it is busy. It then performs a firmware integrity test. Then a test is performed by microprocessor 204 on local RAM 194 of each slave controller 128a–h using address decoder 190 and a program stored in PROM 192. After completion of these tests, each slave controller 128a–h stores the test results in a predetermined section of its local RAM 194. This section of RAM 194 is accessible to both master controller 126 and slave controllers 128a–h. During these tests, slave controllers 128a–h flash an on board LED (not shown) as an indication that they are functioning. After the tests are completed, the LED is turned off if the tests are passed. The LED is turned on if any test failed. When the testing portion of the diagnostic is completed, controllers 128a–h initialize their analog hardware to a known state, enable master controller command detection circuitry (not shown), clear the busy bit in the I/O register, and wait for commands from master controller 126.

Master controller 126 executes the same RAM and firmware tests as the slave controllers 128a–h using address decoder 154 and a program stored in ROM 156. After these tests are completed master controller 126 performs an echo data integrity test on ROM 130 and a test on RAM 122, 124 of MCAS 22. After the memory tests are completed, master controller 126 tests its on board timers, including interval timer 152, and interrupt controller 150. This completes the local diagnostics of master controller 126. Master controller 126 then performs bus communications tests and reviews slave controller 128a–h test results.

After successful completion of the diagnostics, master controller 126 initializes local master operating system stored in ROM 156. The master operating system enables timing hardware and copies echo data received from computer 20 to slave controllers 128a–h if MCAS 22 is in the external computer mode. Transmit key detection circuitry is then enabled and master controller 126 then waits for a ping command from SASS 26.

During the setup procedure of the stand alone mode of MCAS 22, master controller 126 copies echo data values, determined by a set of operator selected bottom data values, from ROM 130 to each slave controller 128a–h. ROM 130 can contain samples of hydrophone outputs for a plurality of different ocean bottoms 14. By selecting an ocean bottom 14 an operator selects one of the stored ocean bottoms for simulation and causes data representative of the selected ocean bottom 14 to be transferred from ROM 130 of master controller 126 to slave controllers 128-h. Master controller 126 then commands slave controllers 128a–h to use the transferred data to produce a full set of echo data for their respective eighteen acoustic channels. This includes precalculation of data for each update during the simulation in the stand alone mode. When MCAS 22 uses external computer 20, ocean bottom 14 information is transferred from computer 20 after setup. In the external computer 20 mode no precalculation by slave controllers 128a–h is required since all data points are calculated by computer 20 and stored in computer 20.

Master controller 126 then waits for each slave controller 128a–h to indicate task completion. After system setup, master controller 126 enables the transmit key detection circuit and waits for a ping command from SASS 26 to indicate the beginning of a test. When a ping command is received, master controller 12 waits the required delay and then commands slave controllers 128a–h to apply the first interval of echo data to receiver 106. Master controller 126 then periodically generates commands to cause slave controllers 128a–h to cycle to the next interval of echo data until the echo is completed. In the stand alone mode of MCAS 22 the interval and required delay are defined in the section of ROM 130 selected by the selection of an ocean bottom 14.

After the reception of a ping command, master controller 126 starts an echo delay timer within interval timer 152. The delay of the delay timer within interval timer 152 is equal to the time from ping to the time of the beginning of echo reception. After the delay timer is started no further action is taken by master controller 126. Master controller 126 waits until the delay timer within interval timer 152 times out.

When the echo delay timer times out, master controller 126 issues a step command to all slave controllers 128a–h simultaneously. The step command causes slave controllers 128a–h to output the first data set, or interval, to its eighteen analog channels. Slaves 128a–h then wait for the next interval. This process is repeated until all intervals are completed. When slaves 128a–h output the last interval in the echo data set, they perform an echo reset and wait for the next ping.

Master controller 126 also uses interval timer 152 to determine the interval update rate. This interval update is stored in the echo data set and loaded into interval timer 152 during the first snapshot generation. The interval ranges in duration according to the resolution of the simulation. After the first snapshot, interval timer 152 causes master controller 126 to generate step commands at a rate determined by the resolution of the test until the end of the echo data set.

In the stand alone mode, after master controller 126 has issued the last step command, it determines whether a different ocean bottom within ROM 130 has been selected. If the operating mode has changed, master controller 126 disables the transmit key detection circuitry, reloads slave controllers 128a–h with the newly selected information from ROM 130, issues echo reset commands to all slave controllers 128a–h and re-enables the transmit key detection circuit.

Master controller 126 provides the basic twelve kilohertz signals by means of oscillators 30, 32 within controller 126 of MCAS 22 which apply the sine and cosine signals to the rest of MCAS 22 by way of lines 31, 33. Oscillators 30, 32 may be a single very stable quadrature oscillator. Noise for simulating background noise during a test is produced within master controller 126 by noise generator 176 including conventional sound generator 168 and applied to slave controllers 128a–h by way of line 178. Sound generator 168 synthesizes white, periodic and swept frequency noises. Conventional sound generator 168 also provides combinations of three frequencies which can be used to generate coherent noise. Adjustable attenuator 170 controls the noise level.

Obviously, many modifications and variations of the present invention are possible in light of the above teachings. It is therefore to be understood that within the scope of the appended claims the invention may be practiced otherwise than as specifically described.

I claim:

1. A method for generating phase related acoustic data in a system to simulate the output of a plurality of hydrophones of a hydrophone array representative of an ocean bottom for testing a receiver of a sonar sounding system having a channel corresponding to each hydrophone and a master frequency signal, comprising the steps of:
providing analog signals representative of the output of at least two hydrophones of the hydrophone array;
periodically determining a phase angle for each of the analog signals to provide periodic phase shift data for each analog signal;
phase shifting the master frequency signal in accordance with the phase shift data; and,
applying the phase shifted analog signals to respective channels of the receiver.

2. The method of claim 1 comprising the further steps of providing attenuation data representative of the output signals of the hydrophones and attenuating the phase shifted analog signals in accordance with the attenuation data.

3. The method of claim 1 further comprising the step of determining the ocean bottom by the sounding system in accordance with the applied signals.

4. The method of claim 1 further comprising providing digital data representative of the hydrophone output signals and converting the digital data to analog data.

5. The method of claim 1 wherein the frequency of the master frequency signal is substantially equal to the frequency of the signals of the hydrophone array.

6. The method of claim 2, comprising the further steps of:
determining first and second data words representative of the sine and cosine of the phase shift respectively;
modulating the master frequency in accordance with the first data word to produce a first modulated output;
modulating the master frequency signal having a predetermined constant phase delay in accordance with the second data word to produce a second modulated output; and,
summing the first and second modulated outputs to produce a phase shifted output.

7. The method of claim 2 wherein the sonar sounding system has a plurality of periodic updates and the method is repeated for each update.

8. The method of claim 7 wherein the method is repeated for each update for each channel prior to the test except for the step of applying the phase shifted output signals.

9. The method of claim 2 wherein the signals representative of the output of the hydrophones are generated by a computer model.

10. A method for generating phase related acoustic data in a system to simulate the output signals of a plurality of hydrophones of a hydrophone array representative of an ocean bottom for testing a receiver of a sonar sounding system having a channel corresponding to each hydrophone and a master frequency signal, comprising the steps of:
applying the master frequency signal to phase shift means;
providing phase shift data representative of the output signals of at least two hydrophones in the hydrophone array;
applying the phase shift data to the phase shift means and producing phase shift output signals which are phase shifted from the master frequency signal in accordance with the applied phase shift data; and
applying the phase shift output signals to respective channels of the receiver.

11. The method of claim 10 comprising the further steps of providing attenuation data representative of the output signals of the hydrophones and attenuating the phase shifted signals in accordance with the attenuation data.

12. The method of claim 10 further comprising the step of determining the ocean bottom by the sounding system in accordance with the attenuated signals.

13. The method of claim 10 further comprising the step of providing digital data representative of the hydrophone output signals and converting the digital data to analog data.

14. The method of claim 10 wherein the frequency of the master signal is substantially equal to the frequency of sounding signals of the hydrophone array.

15. The method of claim 11, comprising the further steps of:
providing first and second data words representative of the sine and cosine of the phase shift respectively;
modulating the master frequency signal in accordance with the first data word to produce a first modulated output;
modulating the master frequency signal having a predetermined constant phase delay in accordance with the second data word to produce a second modulated output; and,
summing the first and second modulated outputs to produce a phase shifted output.

16. The method of claim 11 wherein the son-ar sounding system has a plurality of a periodic updates and method is repeated for each update.

17. The method of claim 16 wherein the method is repeated for each update for each channel prior to the test except for the step of applying the phase shifted output signals.

18. The method of claim 11 wherein the signals representative of the output of the hydrophones is generated by a computer model.

19. A method for generating phase related acoustical data in a sonar array sounding system to simulate the output signals of a plurality of hydrophones of a hydrophone array representing an ocean bottom for testing a receiver of the sounding system having a channel corresponding to each hydrophone, a plurality of periodic signal updates, and a master frequency, comprising the steps of:
(a) determining a first set of hydrophone signals corresponding to a first update of the plurality of updates, the first set of signals including a respective signal representative of the output of each of at least two hydrophones in the hydrophone array;

(b) determining a second set of hydrophone signals corresponding to a second update of the plurality of updates, the second set of signals including a respective signal representative of the output of each of the two hydrophones in the hydrophone array;

(c) simultaneously storing the first and second sets of signals;

(d) first applying each signal of the first set of signals to a respective channel of the sounding system; and (e) second applying each signal of the second set of signals to a respective channel of the sounding system the second applying occurring after the first applying.

20. A method for testing a receiver of a sonar array sounding system having hydrophone array inputs and a plurality of resolutions, each resolution corresponding to a respective test signal sampling rate, comprising the steps of:

(a) providing hydrophone array output signals representative of a predetermined ocean bottom;

(b) sampling the hydrophone array output signals at a first test signal sampling rate corresponding to a first resolution to provide a set of sample data signals;

(c) first applying the set of sample data signals to the sounding system to first test the system at the first resolution;

(d) selecting from the set of sample data signals a subset of sample data signals corresponding to a second resolution; and (e) second applying the subset of sample data signals to the sounding system to second test the system at the second resolution wherein the sample data signals of the first and second resolutions are derived from the same hydrophone array output signals.

* * * * *